(12) United States Patent
Breesch

(10) Patent No.: US 7,523,520 B2
(45) Date of Patent: *Apr. 28, 2009

(54) WIPER LEVER WITH A DRIVEN WIPER ARM AND A WIPER BLADE

(75) Inventor: Frans Breesch, Borgloon (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/873,524

(22) Filed: Oct. 17, 2007

(65) Prior Publication Data

US 2008/0034530 A1 Feb. 14, 2008

Related U.S. Application Data

(63) Continuation of application No. 10/416,842, filed as application No. PCT/DE01/04307 on Nov. 16, 2001, now Pat. No. 7,293,321.

(30) Foreign Application Priority Data

Nov. 18, 2000 (DE) ................................ 100 57 253

(51) Int. Cl.
*B60S 1/38* (2006.01)
(52) U.S. Cl. .............................. 15/250.201; 15/250.32; 15/250.43
(58) Field of Classification Search ............ 15/250.201, 15/250.32, 250.43, 250.48, 250.451, 250.452, 15/250.453, 250.454, 250.44
See application file for complete search history.

(56) References Cited

U.S. PATENT DOCUMENTS 3,641,614 A 2/1972 Newsome 5,145,274 A 9/1992 Schon
6,279,191 B1 8/2001 Kotlarski et al.
7,293,321 B2 * 11/2007 Breesch ................. 15/250.201

FOREIGN PATENT DOCUMENTS

| DE | 3222864 A | 12/1983 |
|---|---|---|
| DE | 3709810 A | 10/1988 |
| DE | 19734843 A | 2/1999 |
| DE | 19856299 | 6/2000 |
| DE | 19856300 A | 6/2000 |
| FR | 2731191 | 9/1996 |
| JP | 4-108470 | 9/1992 |
| WO | 00/34090 | 6/2000 |
| WO | 00/38964 | 7/2000 |

* cited by examiner

*Primary Examiner*—Gary K Graham
(74) *Attorney, Agent, or Firm*—Michael Best & Friedrich LLP

(57) ABSTRACT

Wiper lever (10) with a driven wiper arm (12) and a wiper blade (16) linked to it for cleaning windows, particularly those of motor vehicles, which is provided with a band-like, long-stretched-out, elastic supporting element (30), which features, on its lower band surface facing the window, a long-stretched-out, rubber elastic wiper strip (24) that can be applied to it, on whose upper band surface (29), particularly in the longitudinal middle area of the supporting element (30), a coupling part (32) is situated and wind deflector strip partial sections (52) extending to the ends of the supporting element are arranged on both sides of the coupling part (32). An especially harmonic transition between the wiper blade (16) and the wiper arm (12) is achieved in the area of the joint (46, 47) connecting these two wiper lever parts if the wiper lever (10) is provided with a cap (60) to cover the connection area between the wiper blade (16) and the wiper arm (12).

20 Claims, 6 Drawing Sheets

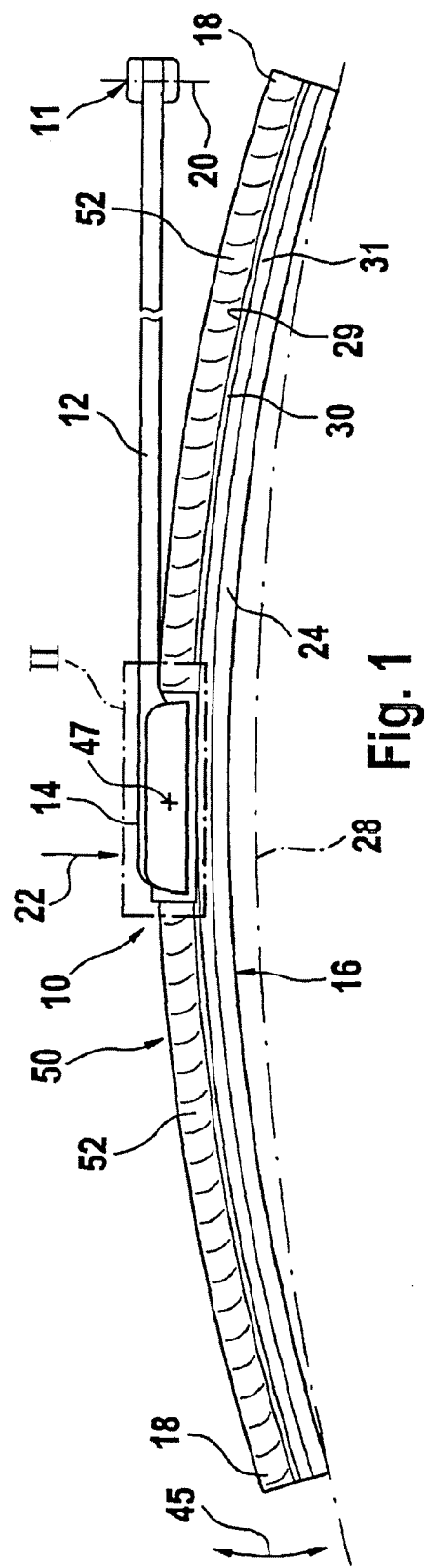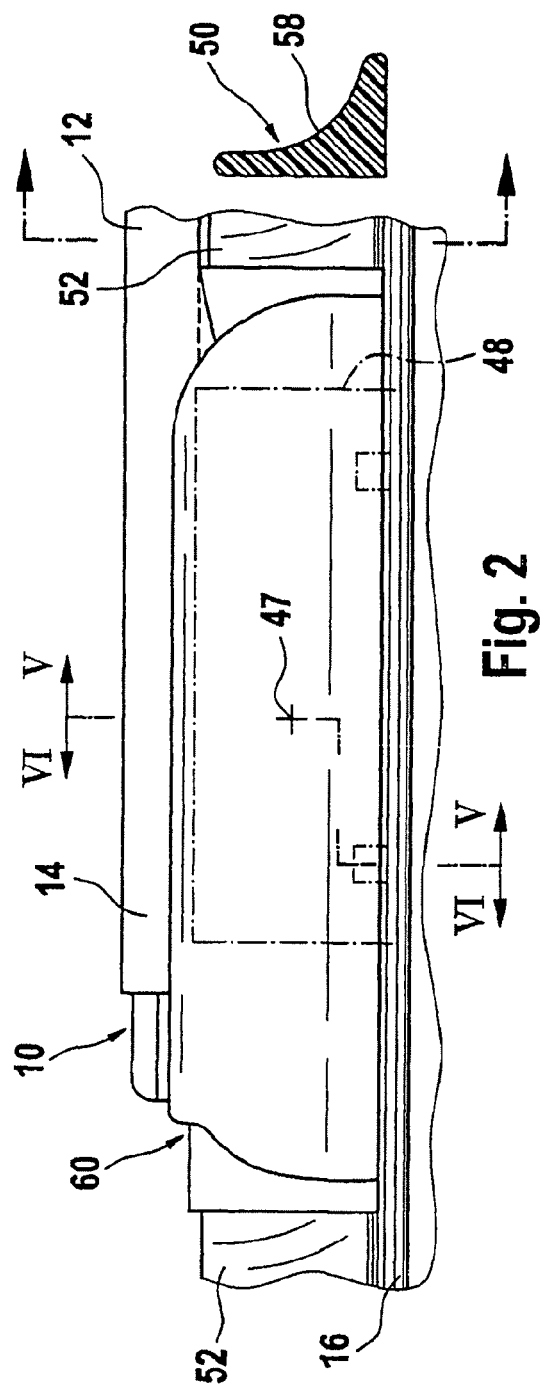

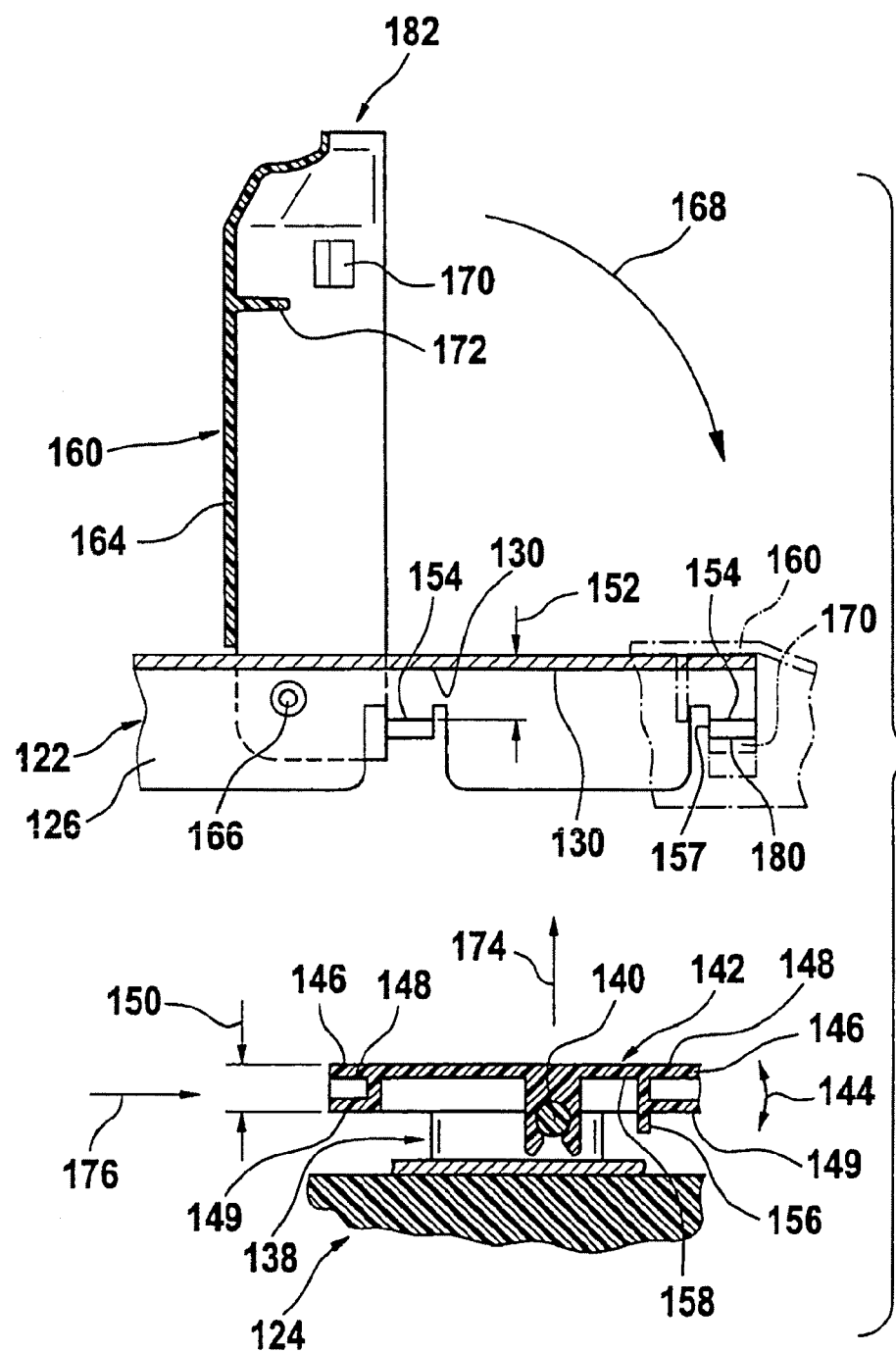

WIPER LEVER WITH A DRIVEN WIPER ARM AND A WIPER BLADE

RELATED APPLICATIONS

This application is a continuation of U.S. application Ser. No. 10/416,842, filed May 16, 2003, now U.S. Pat. No. 7,293,321, which is a national stage filing under 35 U.S.C. 371 of International Application No. PCT/DE01/04307, filed Nov. 16, 2001, which claims priority to German Application No. 10057253.7, filed Nov. 18, 2000, the entire contents of which are incorporated herein by reference.

BACKGROUND OF THE INVENTION

In the case of a wiper lever of the type designated in the pre-characterizing clause of the independent claim, the supporting element of the wiper blade is supposed to guarantee, over the entire wiper field being covered by the wiper blade, the most uniform possible distribution of wiper blade application force on the window originating from the wiper arm. Due to the corresponding curvature of the relaxed supporting element—i.e., when the wiper blade is not adjacent to the window—the ends of the wiper strip that are placed completely against the window during wiper blade operation are loaded by the supporting element that is stressed vis-à-vis the window, even when the radii of curvature of spherically curved vehicle windows change with every wiper blade position. As a result, the curvature of the wiper blade must be somewhat greater than the greatest curvature measured in the wiper field on the to-be-wiped window. The supporting element thereby replaces the expensive supporting bracket design that is required to distribute the application force and that has two spring rails, which are arranged in the wiper strip and are used for transverse reinforcement of the rubber elastic wiper strip, as is the practice with conventional wiper blades (DE-PS 1247 16 1).

In the case of a known wiper lever with a wiper blade where, for reasons related to bearing pressure distribution, the supporting element projects in the wiper blade middle range far beyond the width of the wiper strip (DE-PS 1247161), the front side facing the air stream can be affected by the build-up of excess pressure. On the other hand, a considerable negative pressure builds up on the rear side facing away from the air stream due to the abovementioned wiper blade structure. In operation, though the wiper blade executing a pendulum motion constantly changes its position relative to the inflowing air stream, its one longitudinal side does indeed continually face this stream more or less strongly and is therefore designated as the front side while its other longitudinal side consequently is also viewed as the rear side. In the combined action of these two previously mentioned pressures, both of which are acting in the opposite direction of the wiper blade application force, they are at least reduced at higher travel speeds so that a proper wiper result is no longer possible. In order to remedy this unfavorable flow behavior, in the case of a known wiper lever in accordance with the species (DE 198 56299.3 A1), a wind deflector strip with a flow surface facing one of the main flow directions is arranged on the upper band surface of the supporting element. This wind deflector strip has two sections or partial strips each of which extends from the connecting device to the ends of the supporting element or the wiper blade. As a result, this produces a free space in the progression of the wind deflector strip for positioning the connecting device. Manufacturers of luxury class vehicles in particular object to this optical interruption of the wind deflector strip for reasons related to styling. In addition, this interruption of the flow surface on the wind deflector strip contributes to an undesirable increase in air stream noise due to the edges and gaps that are thereby produced.

It is true that adapting the cross-section of a holder situated in the longitudinal middle area of the wiper blade on its upper band surface for two spring rails belonging to the supporting element to the cross-section of the wind deflector strip sections extending on both sides of the holder is known in the case of the wiper lever according to the species, but the means to connect the wiper blade to the wiper arm are also completely free in this case so that this wiper lever, including a wiper arm and wiper blade, is also encumbered with the already described disadvantages.

SUMMARY OF THE INVENTION

Due to the arrangement of the cap in the connection area between the wiper arm and the wiper blade, an elegant transition between the two wind deflector strip sections adjacent to the connecting device can be achieved via an appropriate formation of the cap. In doing so, it is possible to adapt at least the cap sections, which can also cover the areas of these sections that are adjacent to them, to the shape of the wind deflector strip. Moreover, problem zones on the wiper lever that oppose a laminar flow of the air stream and generate air stream noise are thereby avoided. Finally, the cap protects the sensitive articulated connection between the wiper arm and the wiper blade against environmental influences such as dirt from the road, snow, ice, etc.

A particularly simple adaptation of the cap to the embodiment of the wiper blade is possible if the cap is supported by the wiper blade, in particular if it is locked to the wiper blade.

This can be achieved in a cost-effective manner by the cap that is U-shaped in cross-section being fabricated of an elastic plastic and being provided with elastically deflectable locking means, which are assigned to counter-locking means of the wiper blade.

If the wiper blade's counter-locking means are embodied on the outer longitudinal edges of the band-like supporting element, no special measures are required to embody the counter-locking means.

In order to obtain a stable, locking connection that can handle the pressure of the inflowing air stream, the cap is provided with at least one support cooperating with the upper band surface of the supporting element, whereby elastically deflectable locking noses that grip under the supporting element and serve as locking means are formed on the cap.

With respect to the flexibility of the wiper blade or the supporting element it can be particularly advantageous if, in the area of the holding claws of the coupling part serving as a connecting piece, the cap is provided, on its elastically deflectable inside wall, with clamp-like safety claws that grip over the holding claws.

Simple assembly of the wiper lever is produced if the cap is provided with a passage opening for the wiper arm.

Because the wind deflector strip material ages over the course of time, something that goes hand in hand with a certain shrinkage, an air gap can form between the cap and the front sides of the wind deflector strip partial sections that face it, which can lead to the already described disadvantages regarding the optical effect and the intensification of noise. This can be avoided in accordance with a development of the invention with extensions on the cap that cover the end areas of the wind deflector strip partial sections that face them.

For optical reasons and for reasons related to the undesired generation of air stream noise, it can be advantageous if the cap is provided with a flute on its one longitudinal wall in continuation of the flow fluting of the wind deflector strip.

For certain application cases, it can be favorable if the cap is supported by the wiper arm.

Due to a pivoted arrangement of the cap on the wiper arm, the cap always remains connected to the wiper arm and present. It can be moved between two positions: the operating position and release position.

In order to secure the cap in its operating position, the wiper arm is provided with rest receptacles that align with one another on opposite longitudinal walls, which are assigned pivot pins arranged on the cap walls adjacent to the longitudinal walls.

A simple, suitable pivot arrangement is achieved for the cap if the cap is manufactured of an elastic plastic and the pivot pins are arranged on elastically deflectable wall areas of the cap.

In order to secure the cap in its operating position, locking means are formed on the elastically deflectable wall areas of the cap, which cooperate in the cap's operating position with counter-locking means on the wiper arm.

In the case of a wiper lever in which the connection between the wiper arm and the wiper blade is accomplished via a sliding movement, whereby a stop shoulder of the wiper arm fixes the operating position with a counter-shoulder of the wiper blade, an unintentional release movement of the wiper blade from the wiper arm is safely avoided if a safety nose facing the wiper blade is arranged on the cap, which nose engages in this operating position and in the cap's operating position so that it fits in a safety recess on the wiper blade.

Additional advantageous further developments and designs of the invention are disclosed in the following description of the exemplary embodiments depicted in the associated drawing.

DESCRIPTION OF THE DRAWINGS

The drawings show:

FIG. 1—A side view that is not drawn true to scale of a wiper lever whose wiper blade is provided with a wind deflector strip;

FIG. 2—An enlarged representation of a detail designated by II in FIG. 1 with the cross-sectional surface of the wind deflector strip;

FIG. 12—A section of the wiper blade and wiper arm vis-à-vis one another in a pre-assembly position, whereby a partial region of the cap is drawn in the operating position with a dash-dotted line.

DETAILED DESCRIPTION

Figure 3:
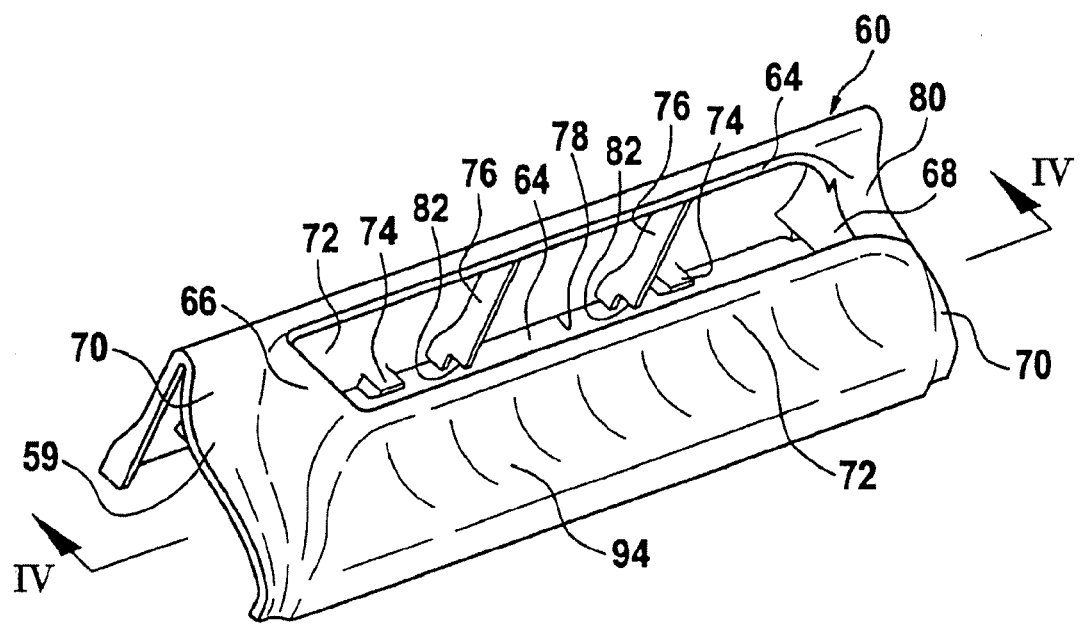
FIG. 3—A perspective representation of a cap belonging to the wiper lever.

A first exemplary embodiment of a wiper lever 10 according to the invention (FIG. 1) includes a wiper arm 12 driven on one end and guided on a motor vehicle (not shown here). The driven end of the wiper arm has been assigned reference number 11 in FIG. 1. A long-stretched-out wiper blade 16 belonging to the wiper lever 10 is linked to the other, free end 14 of the wiper arm. The wiper arm 12 is positioned on its drive end 11 in such a way that it can move in a pendulum fashion between reverse positions around a pendulum axis 20 during wiper operation in a vertical plane on the drawing plane. In doing so, the wiper blade 16 is moved transverse to its longitudinal extension over the to-be-wiped window, whereby it is adjacent to the surface 28 of the to-be-wiped window with a rubber elastic wiper strip 24. The wiper strip 24 is connected parallel to its longitudinal axis with a band-like, long-stretched-out, elastic supporting element 30, on whose upper band surface 29 facing away from the window a coupling part 32 is situated (FIGS. 5 and 7) via which the wiper blade 16 is connected to the wiper arm 12 in an articulated manner to form the wiper lever. The wiper strip 24 is therefore arranged on the lower, window-facing band surface 31 of the supporting element 30. The coupling part 32, whose cross-section is T-shaped in sections, faces the supporting element 30 with its T-head 34 and grips around the outer longitudinal strips 40 of the supporting element 30 that face away from one another with claws 38 arranged on the T-head. The coupling part 32 is connected to the supporting element 30 at these claws, for example welded and/or fixed here to press the claws together. In the case of the embodiment, the supporting element 30 includes two spring rails 42, which extend parallel to one another lying in a common plane. The facing inner longitudinal strips 41 of the spring rails 42 lie in the open-edge longitudinal grooves of the wiper strip 24.

Figure 4:
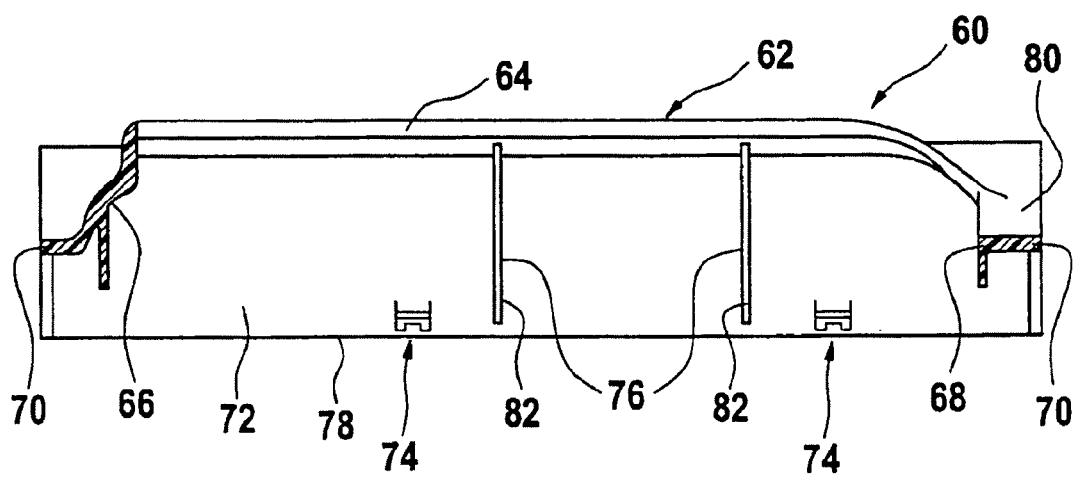
FIG. 4—An enlarged depiction of the longitudinal section through the cap along line IV-IV in FIG. 3.
Figure 5:
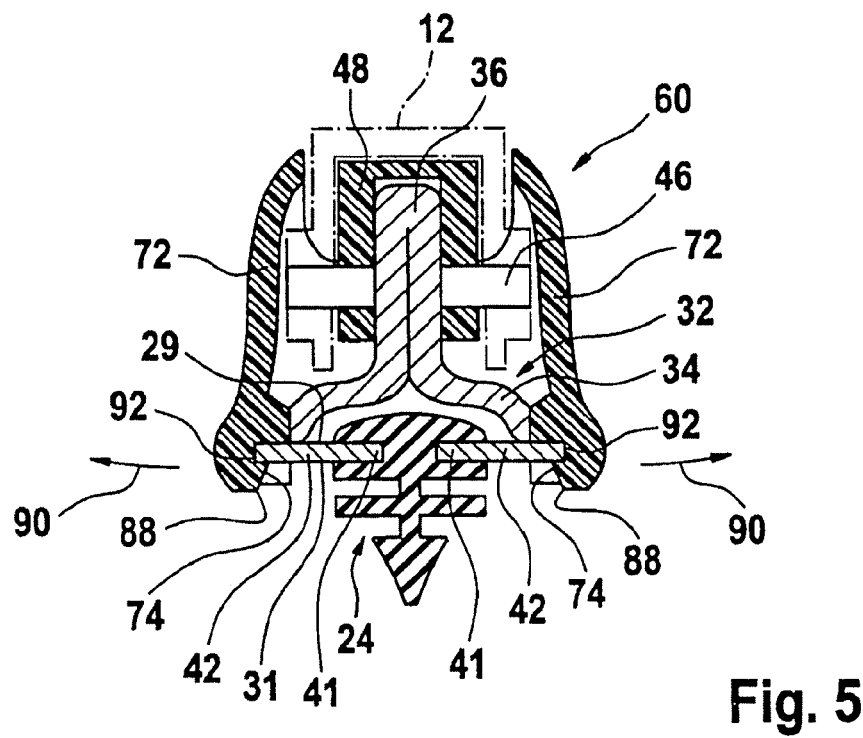
FIG. 5—A cross-section along line V-V through the arrangement in accordance with FIG. 2.
Figure 6:
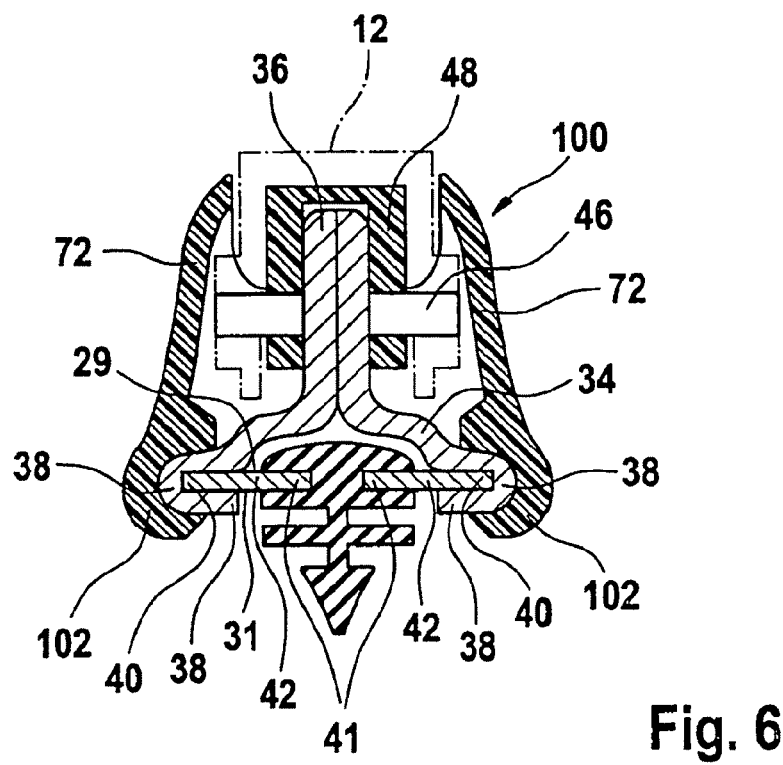
FIG. 6—A cross-section along line VI-VI through another embodiment of the arrangement in accordance with FIG. 5.
Figure 7:
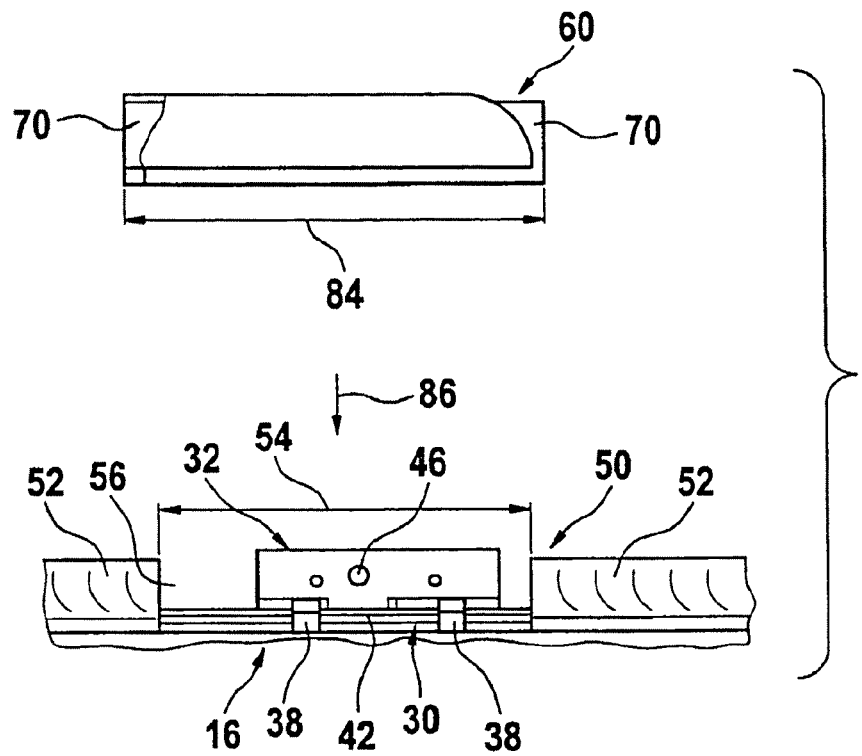
FIG. 7—A representation of the wiper blade and cap vis-à-vis one another in a pre-assembly position.

The T-foot 36 of the coupling part 32 extends away from the supporting element 30 and is penetrated by an articulated bolt 46 whose two ends project out of the T-foot, as shown in FIGS. 5 and 6. The wiper arm 12 (indicated with a dash-dotted line in FIGS. 5 and 6) engages at this articulated bolt or at its free ends with correspondingly embodied rest recesses. An adapter 48 that is preferably fabricated of plastic is located between the T-foot 36 and the wiper arm 12, and this adapter guarantees an operationally reliable connection between wiper arm 12 and wiper blade 16 to form the wiper lever 10. FIGS. 5 and 6 show that the articulated bolt 46 or its articulation axis 47 essentially extends in the direction of the pendulum or work movement of the wiper lever 10. As FIG. 1 shows, the to-be-wiped surface 28 of the window is curved. Since the line 28 is supposed to represent the greatest curvature of the window surface, it is clearly evident that the curvature of the still relaxed wiper blade 16 that is adjacent to the window surface at its two ends 18 is greater than the maximum curvature of the window. Under the application force acting in the direction of arrow 22 (FIG. 1) and exerted by the wiper arm 12, the wiper blade applies its rubber elastic wiper strip 24 arranged on the lower band surface 31 of supporting element 30 to the window surface 28 over its entire length. In doing so, tension builds up in the elastic supporting element 30 fabricated of metal and this tension is responsible for the proper application of the wiper strip 24 over its entire length on the window, as well as for a uniform distribution of the application force 22. Moreover, the spring rails 42 of the supporting element 30 are responsible for the required transverse stabilization of the rubber elastic wiper strip 24. Because the normally spherically curved window does not represent a section of a spherical surface, the wiper blade 16 must be able to constantly adapt to the respective position and progression of the window surface 28 vis-à-vis the wiper arm 12 during its wiper operation. For this reason, a smooth-running articulated connection between the wiper arm 12 and the wiper blade 16 that enables an oscillation motion around the pivot pin axis 47 is required. Furthermore, FIG. 1, in connection with FIG. 5, shows that the articulation axis 47 is also aligned transverse to the direction of the application force (arrow 22). FIGS. 1, 2 and 7 show that the wiper blade is provided on the upper band surface 29 of the supporting element 30 with a wind deflector strip 50 connected with the wiper strip 24 for example, and this wind defector strip includes two partial sections 52 that are at a distance 54 from one another as seen in the longitudinal direction of the wiper blade (FIG. 7). A free space 56 in the wind deflector strip 50 is thereby produced, which facilitates the arrangement of the coupling part 32 on the supporting element 30. The wind deflector strip 50 is provided with a flow fluting 58 on its one longitudinal side against which the air stream mainly flows (FIG. 2). In order to cover the articulated connection between the wiper arm 10 and the wiper blade 12 or between its coupling part 32 and to achieve a harmonic transition between the facing ends of the partial sections 52 of the wind deflector strip 50, the wiper lever 10 also has a cap 60 whose structure is supposed to be explained on the basis of FIGS. 3 and 4 in particular. The cap has a trough-shaped middle section 62, whose trough base is largely removed so that a passage opening 64 is produced. As FIG. 3 in particular shows, extensions 70 that project beyond the two transverse end walls 66 and 68 are adjacent and their shapes are adapted to the cross-sectional shape of the wind deflector strip 50 and they also feature a flow fluting 59. The two longitudinal walls 72 of the cap 60 that is manufactured of an elastic plastic are provided with elastically deflectable locking means, which are embodied as locking noses 74 in the exemplary embodiment. In this connection, two locking noses 74 are each arranged at a distance from one another on each longitudinal wall 72 and the locking noses of the two longitudinal walls 72 are opposite one another in pairs (FIGS. 3 and 5). In addition, supporting or reinforcing walls 76 are arranged on each longitudinal wall, in particular between the locking noses 74, and the walls extend essentially from the passage opening 64 until close to the trough edge 78 of the cap 60. The one transverse wall 68 of the cap 60 is provided with a channel 80, which extends from the passage opening 64 over a small partial section to the trough edge 78 and terminates at the end of the extension 70. The ends of the supporting rips 76 facing the trough edge 78 are recessed matching the width of the supporting element 30 so that supports 82 are produced. A flute 94 is also embodied on the one longitudinal wall 72 of the cap 60 in continuation of the flow fluting 58 of the wind deflector strip 50 or in continuation of the flow fluting 59 on the extensions 70.

Assembling the cap on the wiper blade shall be explained in the following on the basis of FIGS. 5 and 7.

As can be seen from the pre-assembly position in FIG. 7, the entire length 84 of the cap including its extensions 70 is greater than the distance 54 between the two partial sections 52 of the wind deflector strip 50. This is caused by the two extensions 70. Starting from the pre-assembly position (FIG. 7), the cap 60 is placed on the wiper blade 16 in the direction of the arrow 86. During the placement movement, the locking nose 74 deflects in the direction of the arrow 90 in FIG. 5 because of its shape, for example the formation of starting bevels, 88, when the starting bevels 88 hit against the longitudinal strips 40 of the supporting element 30. The deflection can be achieved either via certain cross-sectional modifications to the locking nose that are known to the specialist and/or by an elastic deflection of the longitudinal walls 72 of the cap 60. The assembly movement (arrow 86) of the cap is ended when the supports 82 on the supporting rips 76 are sitting at the upper band surface 29 of the supporting element 30. In this position the locking noses 74 can spring back into their initial position, because the outer longitudinal strips 40 of the supporting element 30 can reach into the rear sections 92 of the locking noses 74, whereby the locking noses grip under the supporting element 30 and thereby bring about a secure fit of the cap 60 onto the wiper blade 16. In the operating position of the cap 60 that is now achieved, the extensions 70 of the cap 60 each cover the facing end sections of the partial sections 52 of the wind deflector strip 50. Since the shape of the extensions essentially represents a continuation of the contour of the wind deflector strip 50, a harmonic transition between the wind deflector strip and the cap is guaranteed. In addition, the middle section 62 can also be provided with at least a slight flute 94 in accordance with the respective spatial possibilities so that a cap with a flow-favorable surface is produced, which can contribute to the quiet operation of the wiper lever 10.

After the cap has been connected to the wiper blade, further assembly of the wiper lever can take place by the free end 14 of the wiper arm 12 being guided through the passage opening 64 thereby producing the articulated connection. Depending upon the design of the articulated connection, however, it can also be necessary to first stick the wiper arm through the passage opening 64 of the still loose cap, creating the articulated connection, and then lock the cap on the wiper blade in the described manner.

An alternative possibility for fastening the cap 100 to the wiper lever 10 is shown in FIG. 6. In contrast to the embodiment just described in which the locking noses 74 engage on the supporting element 30 and therefore must be placed next to the claws 38 of the coupling part 32, the safety claws or holding claws 102 of the cap 100 grip around the claws 38 of the coupling part 32. They are therefore placed and formed in such a way that they act upon the wiper blade in accordance with the arrangement according to FIG. 6. The assembly of the cap 100 corresponds in terms of its sequence to the assembly of the cap 60 according to FIG. 5. One advantage of the embodiment according to FIG. 6 can lie in the fact that only the claws 38 of the coupling part 32 act upon the supporting element 30 so that no additional reinforcement of the middle section of the supporting element 30 is achieved. The cap 100 in FIG. 6 corresponds in all additional characteristics to the cap 60 in FIGS. 3 and 5. The structure of the wiper lever also corresponds to the above description.

It is clear from the foregoing description that the cap 60 is provided with elastically extendible locking means 74 or 102, which are assigned to counter-locking means 40 or 38 of the wiper blade 16.

Figure 9:
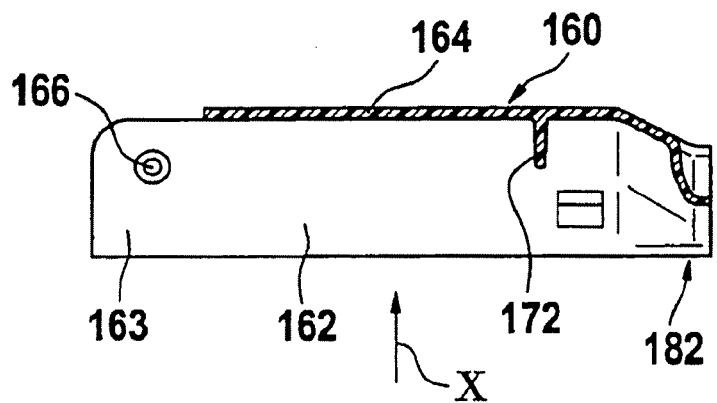
FIG. 9—An reduced longitudinal section through the cap belonging to the design according to FIG. 8.
Figure 10:
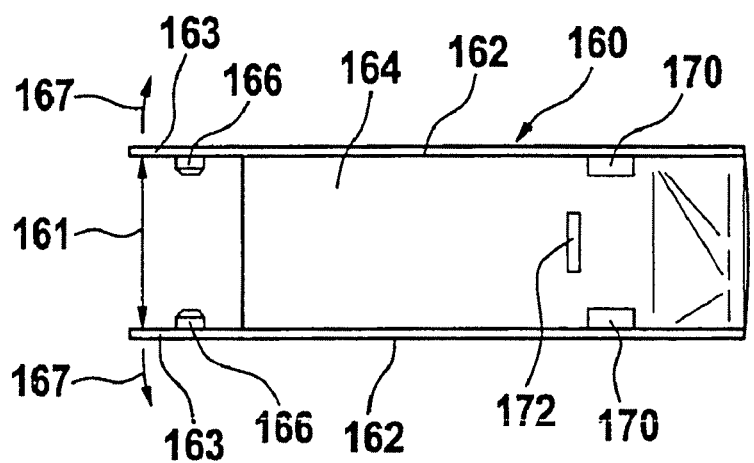
FIG. 10—A view of the cap according to FIG. 9 as seen in the direction of arrow X.
Figure 11:
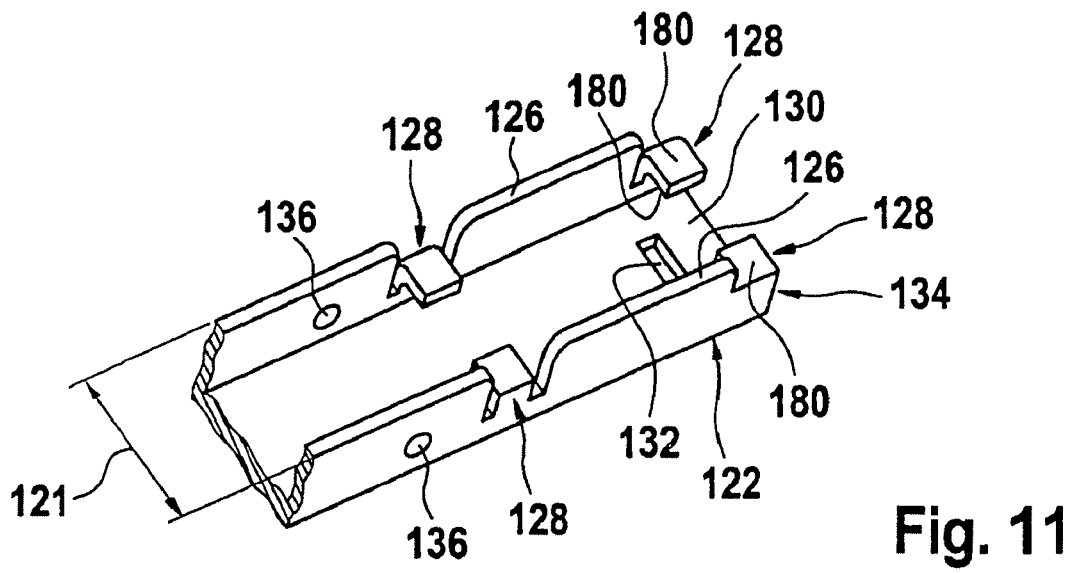
FIG. 11—An isometric representation from below of the connection-side end of the wiper arm belonging to the embodiment according to FIG. 8.

A second embodiment of the wiper lever, in accordance with the invention, is explained in the following on the basis of FIGS. 8 through 12. A wiper arm 122 and a wiper blade 124 belong to a wiper lever 120. The wiper arm has a U-shaped cross-section (FIG. 11), in the area of the articulated connection between the wiper arm and the wiper blade. The U-shaped cross-section has U-legs 126 that form longitudinal walls where tongues 128 have been cut free and bent into the space between the U-legs. The arrangement of the bent tongues 128 is accomplished so that they lie across from one another and are directed opposite one another. FIG. 11 also shows that an opening 132 is arranged near the free end 134 of the wiper arm 122 on its U-base surface 130. Finally, FIG. 11 also shows that, on the other side of the bent tongue pairs 128 (as viewed from the wiper-arm end 134), there is a borehole 136 in each of the U-legs 126, whose borehole axes are aligned with each other. Only a small partial section of the wiper blade 124 belonging to the wiper lever 120 is depicted in FIG. 12, which shows the wiper-blade side components for connecting the wiper blade to the wiper arm 122. A holder 138 for an articulated bolt 140, aligned transverse to the wiper blade longitudinal extension, is arranged on the upper side of the wiper blade 124 facing the wiper arm 122. An adapter 142 is locked onto the articulated bolt in a manner that is known per se. This results in an articulated arrangement of the adapter 142 vis-à-vis the wiper blade, whereby the longitudinal axis of the articulated bolt 140 represents the articulated axis. Thus, the wiper blade 124 can oscillate freely within a certain angle around the articulation axis of the articulated bolt 140 (double arrow 144 in FIG. 12). The adapter 142, manufactured of an elastic plastic, is provided on both its longitudinal ends 146 with fitting surfaces 148, 149, which are at a distance 150 from one another corresponding to the distance 152 between the inside wall of the U-base surface 130 and the bent tongues' 128 surface 154 that faces this inside surface (FIG. 12). Therefore, the distance 150 of the fitting surfaces 148, 149 from one another corresponds to the thickness of the adapter 142 in the area of these fitting surfaces. FIG. 12 also shows that a stop shoulder 156 directed toward the wiper blade 124 comes out of the fitting surface 149 of the adapter 142 and that a receptacle opening 158 is arranged in the adapter 142.

In addition, a cap 160 also belongs to the wiper lever 120. It is evident from FIGS. 9 and 10 that this cap has an essentially U-shaped cross-section. The distance 161 between the two U-legs 162 is coordinated with the width 121 of the wiper arm 122. In addition, FIGS. 9 and 10 show that the U-legs 162 extend beyond the U-base 164 with extensions 163. Since the cap 160 is manufactured of an elastic plastic, the extensions 163 can be elastically deflected transverse to the longitudinal extension of the U-legs 162. Aligned pivot pins 166 whose pin axes are aligned with one another are located on the facing inner sides of the extensions 163. The diameter of the pivot pins 166 is coordinated with the diameter of the two boreholes 136 in the U-legs 126 of the wiper arm 122 in such a way that the cap 160 can lock onto the wiper arm with deflection of the extensions 163 in the direction of arrows 167 (FIG. 10), whereby the pivot pins 166 reach into the boreholes 136 in the wiper arm U-legs 126 that serve as rest receptacles. The arrangement of and coordination between the wiper arm 122 and the cap 160 are accomplished in such a way that a rotating movement (arrow 168, FIG. 12) between the wiper arm and the cap is possible, because the distances 121 and 161 have been coordinated with each other. A locking nose 170 is arranged on each U-leg as a locking means at a distance from the pivot pins 166 near the other end of the cap 160 on the insides of the U-legs 162, whereby the two locking noses are opposite one another and extend towards each other. A safety nose 172, which extends out from the inside of the U-base 164 between the two U-legs 162, is arranged in this area of the cap 160 on its U-base 164. The wiper blade 124 corresponds, in terms of its further structure, to the wiper blade 16 already described.

Figure 8:
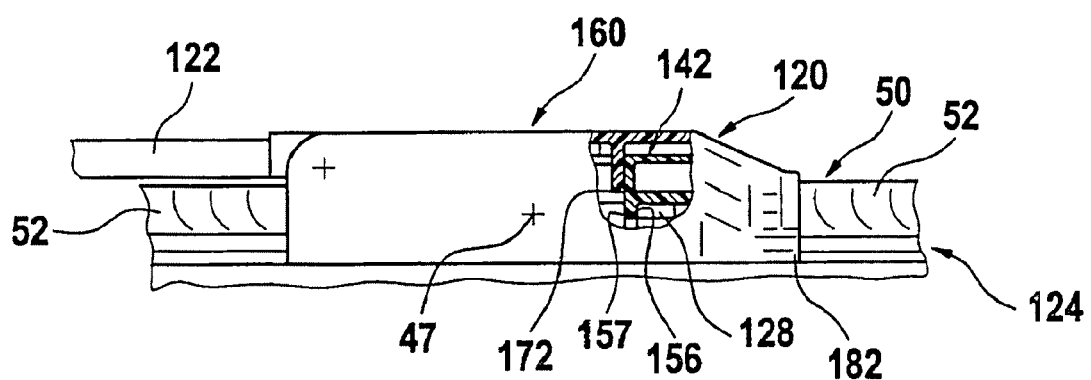
FIG. 8—A partial section of the connection area of a wiper lever executed in another way.

As already mentioned, the cap 160 is connected in an articulated manner with the wiper arm 122 in the described manner. It is therefore pivoted on the wiper arm and is a part of the wiper arm. The pivoted arrangement between the wiper arm and the cap is achieved in that boreholes or rest receptacles 136 that are aligned with one another are arranged on the wiper arm on the U-legs 126 forming opposite longitudinal walls. Pivot pins or bearing pins 166 arranged on the cap walls (formed by the U-legs 162) close to these longitudinal walls are assigned to these boreholes or rest receptacles. In order to connect the wiper blade 124 to the wiper arm 122, the two wiper lever parts 122, 124 must be brought into the pre-assembly position shown in FIG. 12. Then the wiper blade is moved towards the wiper arm in the direction of the assembly arrow 174 until the adapter 142 is adjacent to the inner wall of the U-base surface 130 of the wiper arm. Now the wiper blade is slid in the direction of arrow 176 towards the free end 134 of the wiper arm, whereby the fitting surfaces 148, 149 of the adapter reach between the bent tongues 128 of the wiper arm or its surfaces 154 and wiper arm's U-base surface 130. The sliding movement (arrow 176) is limited by the fact that the stop shoulder 156 of the adapter hits the side (facing the adapter) of the bent tongue 128 that is located on the wiper-arm end 134 and that serves as a counter-stop shoulder 157. In this position, the wiper blade 124 has now reached its operating position vis-à-vis the wiper arm 122. In order to guarantee this position during wiper operation, the cap 160 is turned in the direction of the arrow 168, whereby the safety nose 172 is guided through the opening 132 and reaches into the receptacle opening 158 of the adapter 142. The coordination between the safety nose 172 and the two openings 132 and 158 is accomplished in such a way that the rotating movement of the cap 160 is not hampered by the opening 132, but that the safety nose 172 dips so that it fits into the receptacle opening 158 of the adapter 142 that forms a safety recess. As a result, a relative movement between the wiper arm and wiper blade is no longer possible. So that the cap 160 does not unintentionally move against rotating arrow 168 during wiper operation and the safety feature between the wiper arm and the wiper blade cannot be neutralized, in the operating position depicted in FIG. 8 the cap's 160 locking noses 170 grip under the counter-surfaces 180 of the wiper arm 122 that have been assigned to them and act as counter-locking means, which counter-surfaces are embodied on the bent tongues 128. As FIG. 8 shows, the cap 160 also covers the end areas of the wind deflector strip sections 52 that are close to it. In particular, the free end 182 of the cap 160 facing away from the pivot pins 166 (FIG. 12) is adapted to the cross-sectional profile of the wind deflector strip 50 in such a way that a harmonic transition is produced between the wind deflector strip and the cap.

It is also clearly evident from the foregoing description that the two designs of the wiper lever are provided with a cap 60 or 160 to cover the connection area between the wiper blade and the wiper arm. The advantages that are thereby yielded can be seen primarily in that the cap guarantees a harmonic transition between the two wind deflector strip sections 52 while simultaneously concealing the mechanics of the articulation and protecting the articulation from environmental influences.

The invention claimed is:

1. A windshield wiper apparatus comprising a wiper blade (16) for cleaning a motor vehicle window (28), the wiper blade including a band-like, elongated, elastic supporting element (30) having a longitudinal middle area, a coupling part on the longitudinal middle area, the coupling part connecting the wiper blade to a wiper arm (12), the wiper blade also including a lower band surface (31) having thereon a elongated, rubber elastic wiper strip (24), and the wiper blade including wind deflector strip partial sections (52) extending to the ends of the supporting element and arranged on both sides of the coupling part, and the apparatus comprising a cap (60 or 160) to cover the connection between the wiper blade (16) and the wiper arm (12), the cap having cap sections that cover adjacent areas of the wind deflector strip partial sections (52), the cap sections having a shape complementary to the shape of the wind deflector strip.

2. An apparatus according to claim 1, characterized in that the cap (60) is supported by the wiper blade (16).

3. An apparatus according to claim 2, characterized in that the cap (60) can be locked to the wiper blade (16).

4. An apparatus according to claim 3, characterized in that the cap (60) is approximately U-shaped in cross-section and is fabricated of an elastic plastic and provided with elastically deflectable locking means (74), which are assigned to counter-locking means (40) of the wiper blade.

5. An apparatus according to claim 4, characterized in that the wiper Blade's (16) counter-locking means are embodied on the outer longitudinal edges (40) of the band-like supporting element (30).

6. An apparatus according to claim 4, characterized in that the cap (60) is provided with at least one support (82) cooperating with the upper band surface (29) of the supporting element and that elastically deflectable locking noses (74) that grip under the supporting element (30) and serve as locking means are formed on the cap (60).

7. An apparatus according to claim 4, characterized in that the wiper blade's (16) counter-locking means are embodied on holding claws (38) of the coupling part (32), which with the coupling part is fixed to the supporting element (30).

8. An apparatus according to claim 7, characterized in that, in the area of the holding claws (38) of the coupling part (32), the cap (100) is provided, on its elastically deflectable inside wall, with clamp-like safety claws (102) that grip over the holding claws (38).

9. An apparatus according to claim 1, characterized in that the cap (60) is provided with a passage opening (64) for the wiper arm (12).

10. An apparatus according to claim 1, characterized in that, on its longitudinal ends, the cap (60) covers the end areas of the wind deflector strip partial sections (52) that face it with extensions (70).

11. An apparatus according to claim 1, characterized in that the cap (60) is provided with a flute (94) on its one longitudinal wall (72) in continuation of flow fluting (58) on the wind deflector strip (50).

12. An apparatus according to claim 1, characterized in that the cap (160) is supported by the wiper arm (122).

13. An apparatus according to claim 12, characterized in that the cap (160) is pivoted on the wiper arm (122).

14. An apparatus according to claim 13, characterized in that the wiper arm (122) is provided with rest receptacles (136) that align with one another on opposite longitudinal walls (126), which are assigned pivot pins (166) arranged on the cap walls (162, 163) adjacent to the longitudinal walls.

15. An apparatus according to claim 14, characterized in that the cap (160) is manufactured of an elastic plastic and that the pivot pins (166) are arranged on elastically extendible wall areas (163) of the cap.

16. An apparatus according to claim 14, characterized in that locking means (170) are formed on the elastically deflectable wall areas (163) of the cap (160), which cooperate in the cap's operating position with counter-locking means (180) on the wiper arm (122).

17. An apparatus according to claim 12 in which the connection between the wiper arm (122) and the wiper blade (124) is accomplished via a sliding movement (arrow 176), whereby a stop shoulder (156) of the wiper arm fixes an operating position with a counter-shoulder (157) of the wiper blade, characterized in that a safety nose (172) assigned to the wiper blade (124) is arranged on the cap (160), which nose engages in this operating position and in the cap's operating position so that it fits in a safety recess (158) on the wiper blade.

18. A windshield wiper apparatus comprising a wiper arm (12) connected to a wiper blade (16) for cleaning a motor vehicle window (28), the wiper blade including a band-like, elongated, elastic supporting element (30) having a longitudinal middle area adapted to be coupled to the wiper arm, and the wiper blade including wind deflector strip partial sections (52) extending to the ends of the supporting element and arranged on both sides of the middle area, and the apparatus further comprising a connector connecting the wiper arm (12) to the wiper blade (16), and a cap (60 or 160) to cover the connector, the cap having cap sections configured to cover adjacent areas of the wind deflector strip partial sections (52), the cap sections being adapted to the shape of the wind deflector strip, and the cap having opposite ends with respective openings each having a shape complementary to the shape of the wind deflector strip, wherein the cap (60) is supported by the wiper blade (16), wherein the cap (60) can be locked to the wiper blade (16), and wherein the cap (60) is provided with a passage opening (64) for the wiper arm (12).

19. An apparatus according to claim 18, wherein the cap (60) is provided with elastically deflectable locking means (74), which are assigned to counter-locking means (40) of the wiper blade.

20. An apparatus according to claim 19, characterized in that the (16) counter-locking means of the wiper blade (16) are embodied at least one of on the outer longitudinal edges (40) of the supporting element (30) and on holding claws (38) of a coupling part (32), which with the coupling part is fixed to the supporting element (30).

* * * * *